United States Patent [19]
Pielkenrood et al.

[11] 3,797,668

[45] Mar. 19, 1974

[54] SEPARATION DEVICE

[75] Inventors: Jacob Pielkenrood; Willen Lee Bernard Ambrosius; Willen Kooistra, all of Krommenie, Netherlands

[73] Assignee: Pielkenrood-Vinitex N.V., Assendelft, Netherlands

[22] Filed: Sept. 14, 1972

[21] Appl. No.: 288,964

Related U.S. Application Data
[63] Continuation of Ser. No. 50,282, June 26, 1970, abandoned.

[52] U.S. Cl. ............................................. 210/522
[51] Int. Cl. .............................................. B01d 21/02
[58] Field of Search .......... 210/170, 521, 522, 519, 210/532

[56] References Cited
UNITED STATES PATENTS

| | | | |
|---|---|---|---|
| 3,346,122 | 10/1967 | Cornelissen........................ | 210/522 |
| 1,190,863 | 7/1916 | Corne et al......................... | 210/521 |
| 3,482,694 | 12/1969 | Rice et al........................... | 210/522 |
| 2,673,451 | 3/1954 | Gariel................................. | 210/521 |
| 3,666,112 | 5/1972 | Pielkenrood et al................ | 210/521 |
| 3,666,111 | 5/1972 | Pielkenrood et al................ | 210/521 |
| 3,721,347 | 3/1973 | Pielkenrood et al................ | 210/521 |

FOREIGN PATENTS OR APPLICATIONS

| | | | |
|---|---|---|---|
| 994,118 | 9/1952 | France................................ | 210/521 |
| 746,980 | 3/1956 | Great Britain....................... | 210/521 |
| 682,183 | 5/1930 | France................................ | 210/521 |

*Primary Examiner*—Samih N. Zaharna
*Assistant Examiner*—F. F. Calvetti

[57] ABSTRACT

A device for removing different components from a liquid, comprising a supply and a discharge chamber between which one or more separators having sloping passages between corrugated plates, thoughs or tubes are provided, which device furthermore comprises additional means for accomplishing a supplementary separation of such components upstream and/or downstream of the separator or separators, which additional means may comprise flotation and/or sedimentation chambers with means for adding flocculation and/or precipitation agents to the liquid to be treated, and/or one or more additional separators arranged in such a manner that the liquid to be treated is flowing either in series or in parallel through these separators.

16 Claims, 11 Drawing Figures

INVENTORS
JACOB PIELKENROOD
WILLEM L.B. AMBROSIUS
WILLEM KOOISTRA
BY Bayard H. Michael
ATTORNEY INVENTORS
JACOB PIELKENROOD
WILLEM L. B. AMBROSIUS
WILLEM KOOISTRA
BY Bayard H. Michael
ATTORNEY

SEPARATION DEVICE

This is a continuation of application Ser. No. 50,282, filed June 26, 1970, now abandoned.

BACKGROUND OF THE INVENTION

The invention relates to a device for removing different components from a liquid, comprising a supply and a discharge chamber, between which one or more separators with sloping passages between corrugated plates, troughs or the like are provided.

Devices of this kind are known, for instance from the co-pending application Ser. Nos. 47,575 and 47,576, both of which were filed on June 18, 1970 and issued as U.S. Pat. Nos. 3,666,111 and 3,666,112, respectively;

In the passages of a separator in such a device, the liquid is divided into partial flows in which the separation path length is reduced accordingly, the heavier components sinking towards the valleys and the lighter components rising toward the tops of these passages. Since these passages are sloping, the sediment in the valleys will slide downward, and the lighter components will flow upwards, so that these components may be collected at the corresponding ends of the separator.

Such devices operate, in general, very satisfactorily, but under certain circumstances the separation effect is insufficient.

An insufficient operation is, for instance, met with when the particles to be separated from a liquid, because of the relatively small dimensions and/or the density thereof, rise or sink too slowly. This is the case with the waste water of slaughter-houses, meat factories, sewage water and the like, and it is often hardly possible to remove albuminous or fatty substances from such liquids.

In other cases, when treating a liquid containing components of strongly different character and/or particle sizes, it is often impossible to obtain an overall satisfactory separation of all these components with a single plate separator with the usual length (which is generally restricted by the depth of the basin in which separator is to be placed) and with the optimal velocity of the liquid flow in the passages of this separator. Generally the larger particles are completely separated, but the smallest ones are carried along with the liquid.

SUMMARY OF THE INVENTION

The invention provides an improved separation device of this kind, which is characterised by one or more additional means which are provided upstream and/or downstream of a separator for accomplishing a supplementary separation of one or more components.

These additional means may be in the form of flotation and/or sedimentation chambers in which the liquid, before entering and/or after leaving a separator, may be subjected to an additional flotation or sedimentation treatment, more specifically by adding a flocculation or precipitation agent thereto, so that the separator may exclusively be adapted to the separation of other components.

It is also possible to use as such additional means one or more additional separators arranged in such a manner that the liquid to be treated is flowing in series through these separators, each separator being adapted to the separation of specific components. The connecting means between these separators may, again, act as flotation and/or sedimentation chambers.

In other cases a number of separators may be connected more or less symmetrically with one or more of such flotation and/or sedimentation chambers, the liquid to be treated flowing in parallel through these separators.

DESCRIPTION OF THE PREFERRED EMBODIMENTS

Figure 1:
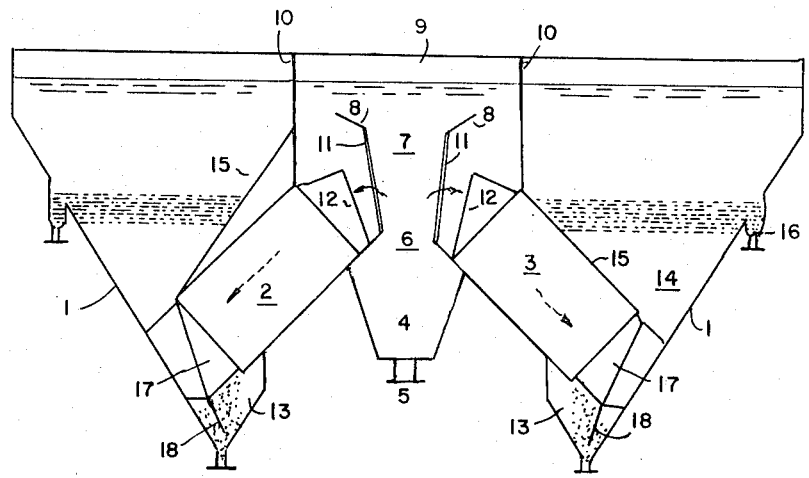
FIGS. 1 and 2 show diagrammatical cross-sections of two embodiments of the invention with two separators in parallel and additional flotation and sedimentation chambers.

The device of FIG. 1 comprises a tank 1 in which two separators 2 and 3 are symmetrically arranged. Between these separators a supply chamber 4 is situated, with, at its lower end, a supply duct 5 for the liquid to be treated.

At the lower side of the supply chamber 4 means (not shown) for supplying a flocculation agent and, if necessary, for injecting air, are provided. These agents may, during the residence time of the liquid in this chamber, accomplish a flocculation action.

By means of such agents specific components, for instance albuminous or fatty substances in waste water from meat factories or the like, may be caused to coalesce, so that these components, which, otherwise, are hardly separable, are easily separated, and, when air is injected, these groups of coalesced particles may also absorb air or will be surrounded by an air coating, so that they become sufficiently lighter than water to rise quickly to the surface of the liquid At the upper end of the chamber 4 a narrower throat 6 is provided promoting the mixing of the flocculation agent with the liquid. This throat 6 is followed by a wider part 7 bordered by two side plates 8, between which the flow velocity is gradually decreased for facilitating the flakes to rise into a flotation chamber 9, which is separated from the tank 1 by two partitions 10. The plates 8 are provided with slots 11 which are sufficiently narrow for stopping the flakes, and have such a slope that the flakes easily slide upward along their surface.

The liquid without the flakes may flow to the entry side of the separators 2 and 3 through the slots 11. These entry sides may be provided with guiding channels 12 as described in the above-identified U.S. Pat. No. 3,666,111, diverting the liquid towards the valleys of the passages of these separators. The remaining lighter particles may return to the flotation chamber 9 and float on the liquid in that chamber.

The heavier components will gradually precipitate in the valleys of these passages, leaving the separators at the lower ends and being collected in sedimentation chambers 13 from which they may be removed. The liquid then rises in a corresponding discharge chamber 14 bordered by walls of the tank 1, the corresponding partition 10 and a sloping wall 15. The latter is either connected to the separator in question as indicated in the case of the separator 2, or is a bordering wall of the separator itself as in the case of separator 3. A special advantage is that the separator may, then, easily be removed for being cleaned.

The discharge chambers 14 are diverging in the upward flow sense, leading to a gradually decreasing flow velocity, so that small flakes not being separated in the separators may be combined to a flake blanket floating in the discharge chamber in question, and forming a filter for other flakes or fine particles dragged along with the liquid. This blanket may gradually be removed at 16 in order to maintain a constant thickness thereof. The slope of the wall 15 is to be adapted to this operation.

At the exit end of the separators 2 and 3 guiding partitions 17 may be provided, as described in the above-identified U.S. Pat. 3,666,111, and may be provided with an extension piece 18 which is immersed in the sediment in the chamber 13, forming a liquid lock and suppressing turbulences which may cause remixing of the sediment and the liquid. Heavy components precipitating in the discharge chamber will be collected at the other side of this partition in the chamber 13.

Figure 2:
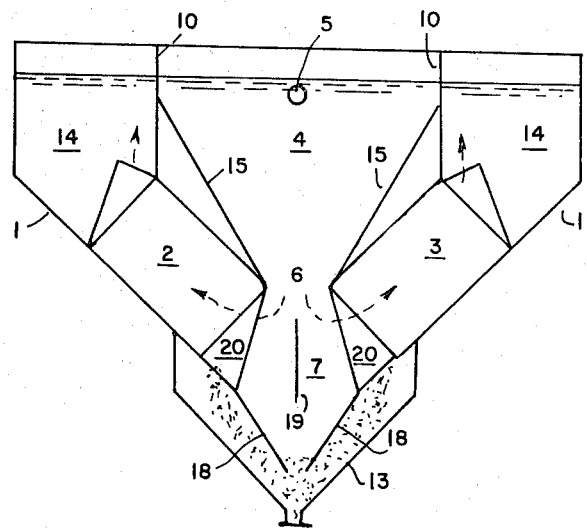

FIG. 2 shows a similar device which is intended for treating liquids containing mainly heavy components. Corresponding parts are indicated by the same reference numerals and have the same task as in the first embodiment, so that a detailed description is not necessary. The supply flow is now downwards from the supply duct 5, and precipitation agents may be added to the downward flow, which are thoroughly mixed in the mixing throat 6. The diverging part 7 beyond this throat is divided in two halves by a median partition 19 for obtaining a symmetrical flow distribution.

In the separators the remaining heavy components are separated, and the sediment returns towards the sedimentation chamber 13. The sediment is kept out of contact with the entering liquid flow by means of guiding partitions 20 delimiting guiding channels joining the valleys of the passages of the separator for guiding the sediment towards the chamber 13.

Instead of the symmetrical construction shown it is also possible to construct similar devices with only one separator or with several separators in side-by-side relationship.

Figure 3:
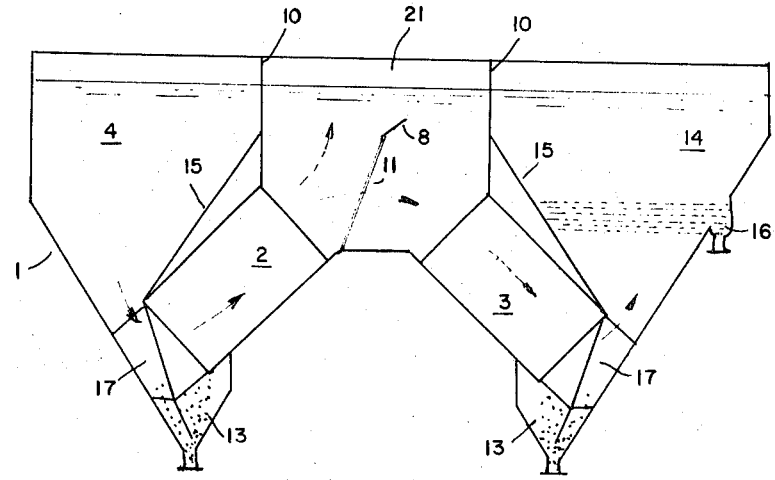
FIG. 3 shows a corresponding cross-section of another embodiment with two separators in series.

FIG. 3 shows a device having a general structure which is some respects correspond with that of FIG. 1, but now the liquid flows in series through the separators 2 and 3. Corresponding parts are indicated by the same numerals as in the case of FIG. 1.

Between the separators 2 and 3 a connecting chamber 21 is delimited by the partitions 10, which chamber serves, in this case, as a flotation chamber for the lighter components separated in the separators 2 and 3, which are collected at the surface of the liquid in this chamber. In this chamber a partition 8 with slots 11 may be provided, which slots as in the case of FIG. 1, are sufficiently narrow for stopping flakes in the liquid which may slide upward along the partition 8.

The liquid flows through the slots 11 into the second separator 3 which is adapted to the separation of the finest particles which are not or insufficiently separated in the first separator 2. The lighter components return to the connecting chamber 21. The heavy components are collected in two separate sedimentation chambers 13 at the lower end of the separators, which may be constructed in the same manner as shown in FIG. 1 and described in the above-identified U.S. Pat. 3,666,111. Unlike FIG. 1, however, the sediment collected in the second sediment chamber is, now, finer than that of the first one.

Figure 4:
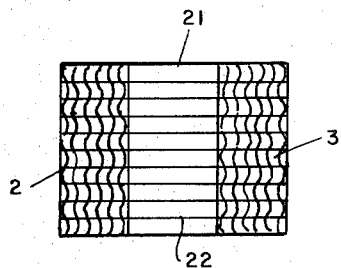
FIG. 4 shows a partial plan view of a modification of the middle part of FIG. 3.

As shown in FIG. 4, guiding partitions 22 may be arranged in the connecting chamber 20 delimiting channels for guiding the liquid emerging from the valleys of the passages of separator 2 towards the valleys of the second separator 3, and the lighter components emerging from the tops of the passages of both separators are guided in the intermediate channels towards the surface of the liquid in the chamber 20. If necessary transverse plates may be arranged in the former channels as described in the above-identified U.S. Pat. No. 3,666,111 for suppressing turbulences and remixing of the various components.

As in the case of FIG. 1 a floating flake blanket may be present in the discharge chamber 14 which may be continuously removed at 16.

Figure 5:
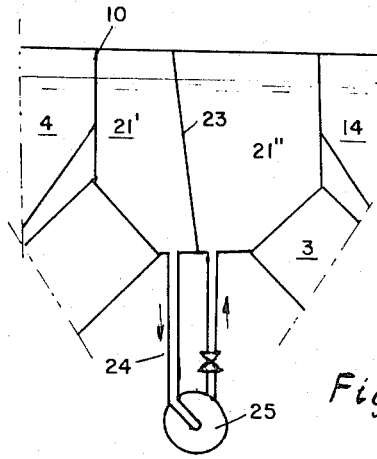
FIG. 5 shows a cross-section of another modification of the middle part of FIG. 3.

FIG. 5 shows another embodiment of the connecting chamber 21, in which a closed partition 23 is arranged dividing the chamber into two separate parts 21' and 21'', which are connected with one another by means of a duct 24 with a circulating pump 25. This construction may be advantageous when in the supply chamber flocculation and/or sedimentation agents are added to the liquid for promoting the separation of specific components, and for the separation in the second separator other agents are required or desirable. In the first part 21' substances may then be added for neutralising the former agents. Moreover air may be injected in the duct 24 for promoting the separation of flakes. It is also possible to add the previous or additional substances in this duct.

Figure 6:
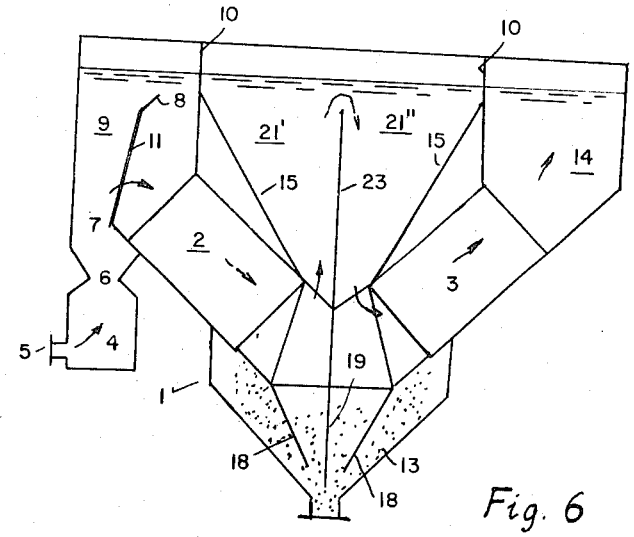
FIGS. 6 and 7 show diagrammatical cross-sections of other embodiments of a device with two separators in series.

The embodiment of FIG. 6 corresponds with that of FIG. 3, but now the slope of the separators 2 and 3 is opposite. Parts corresponding in function and construction with parts of the embodiment of FIGS. 1, 2, 3 and 5 are indicated with corresponding reference numerals. A detailed description is superfluous, as the operation may be deduced from the foregoing description of analogous devices.

The connecting chamber 21 is, again, divided by a partition 23 acting as an overflow weir for the liquid, and the lower end of this chamber communicates with a sedimentation chamber 13 for collecting the sediment emerging from the separators 2 and 3. The partition 23 is extended at its lower end by a partition 13 corresponding with the partition 13 of FIG. 2. The lighter components rise towards the liquid surface in the flotation chamber 9 at the upper end of the supply chamber 4 and in the discharge chamber 14.

Figure 7:
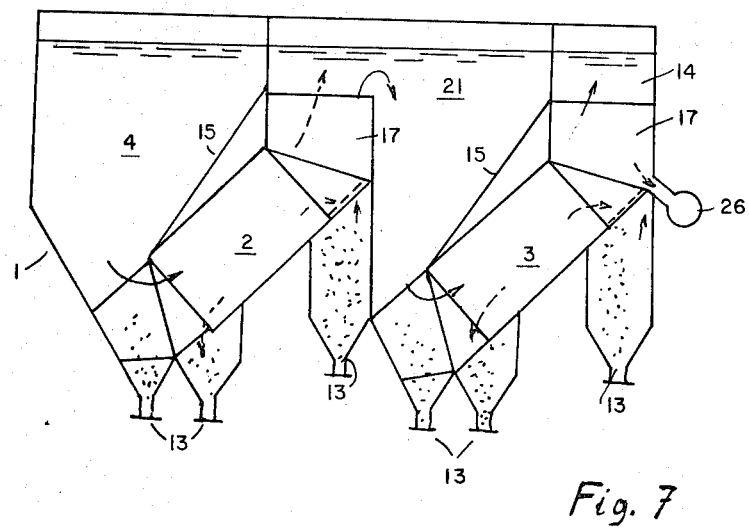

The embodiment of FIG. 7 is specifically designed for separating sediments of different kinds and/or particles sizes, and consists, in principle, of a number of separators according to the above-identified U.S. Pat. No. 3,666,111, to which may be referred. The separators have, therefore, the same inclination, and the discharge chamber of a first separator is combined with the supply chamber of a subsequent one into a connecting chamber. The same reference numerals are used as in the preceding figures, so that a detailed description may be omitted.

This device comprises, in the embodiment shown, six sedimentation chambers, viz. two at the entry and one at the exit side of each separator, as well as an additional discharge duct 26 at the lower end of the discharge chamber 14 for removing residual sediments which may accumulate in that part, as described in the above-identified U.S. Pat. No. 3,666,111.

The device of FIG. 7 may, of course, be adapted to the separation of lighter components, in which case the separators 2 and 3 have a downward slope, and the sedimentation chambers may at least partly be omitted. FIGS. 8–11 show special embodiments of a device for separating lighter components, in which the separators 2 and 3 are arranged in such a manner that space is saved. In this case the tank 1 is constructed as a concrete basin which is sunk into the soil.

Figure 8:
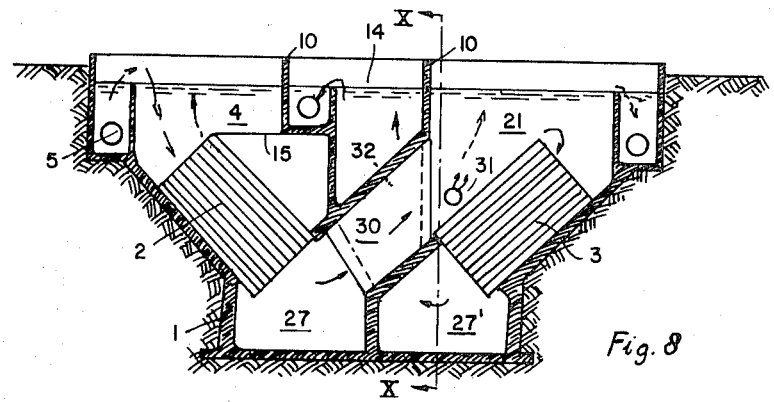
FIGS. 8 and 9 show cross-sections of still another embodiment of the device with two separators in series.
Figure 9:
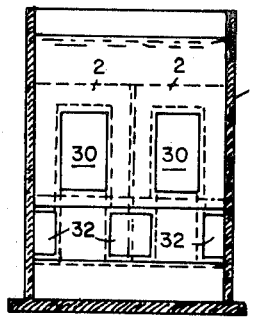
Figure 10:
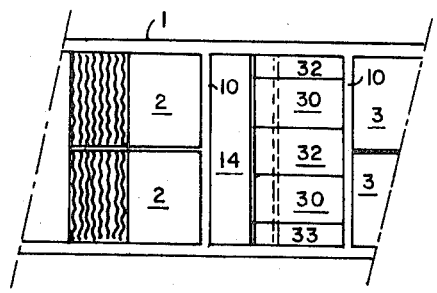
FIG. 10 shows a partial plan view of the device of FIG. 9.

In the embodiment of FIGS. 8–10 the separator 2 connects the supply chamber 4 with a first intermediate chamber 27, and the separator 3 connects the connecting chamber 21 with a second intermediate chamber 27'. The first intermediate chamber 27 is connected with the connecting chamber 21 by means of one or more connecting ducts 30, and the second intermediate chamber 27' is connected with the discharge chamber 14 by means of one or more connecting ducts 32.

As appears from FIGS. 9 and 10, two separators 2 and 3 are placed in side-by-side relationship, and two connecting ducts 30 are provided alternately between three ducts 32, the ducts 30 and 32 crossing one another as appears from FIG. 8.

Figure 11:
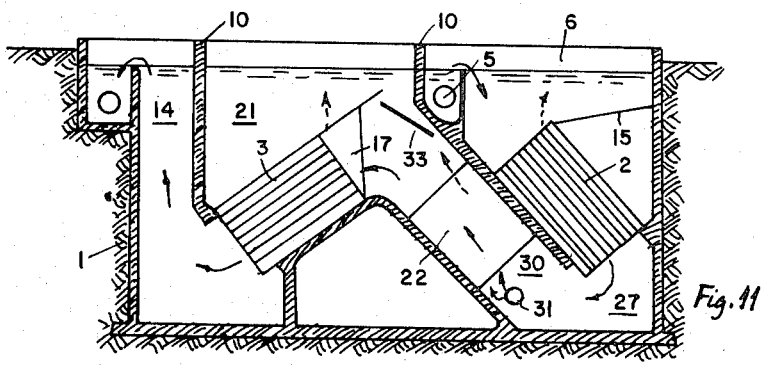
FIG. 11 shows a modification of the device of FIGS. 8...10.

FIG. 11 shows a variation of the embodiment in which the ducts 32 are omitted, and nevertheless a compact construction is obtained. The same reference numerals are used in FIG. 11, and the operation is the same.

In FIGS. 8 and 11 ducts 31 are shown opening in the connecting ducts 30 and intended for introducing flocculation agents and, if desired, air for promoting the separation of the components to be separated. FIG. 11 shows, moreover, guiding partitions 22 in the duct 30 for suppressing turbulences, as well as additional guiding partitions and plates 17 and 33 as described in the above-identified U.S. Pat. No. 3,666,111. Moreover a plate 15 may be provided for closing the space above the separator 2 in FIG. 11 for preventing the accumulation of sediment in that space.

When the liquid to be treated contains also precipitating components, sediment may accumulate on the bottom of the chambers 27 and 27', which may be removed by means of a suction tube (not shown), which may be introduced through the ducts 30 or 32. The extremity of this tube may be moved over the bottom of the chamber 27 or 27', for instance by turning the tube.

It will be clear that, in the various embodiments, means should be used for removing the cleaned liquid, and, separately therefrom, of the light components floating on said liquid. Such means are known per se, and, therefore, have not been shown nor described.

Within the scope of this disclosure many modifications are possible, especially as indicated in the the above-identified U.S. Pat. No, 3,666,111 and 3,666,112.

We claim:

1. A device for separating components from a mixture including a liquid comprising
    a separation basin including a first chamber having an upper portion and a lower portion; and a second chamber;
    means for introducing the mixture to be separated into one of said upper and lower portions of said first chamber;
    a separation assembly positioned in said basin between said first and second chambers and including an intake end communicating with said first chamber, an outflow end communicating with said second chamber, and a plurality of vertically spaced corrugated means having superposed tops and valleys and defining a plurality of substantially parallel separating passages extending at an incline between said intake end and said outflow end, said mixture entering said intake end and flowing through said separating passages toward said second chamber;
    two sets of alternating guiding duct means connected to the lower one of the intake and outflow ends of said separation assembly with the ducts of the first set interconnecting said valley portions of vertically adjacent corrugated means in communication and the ducts of the second set interconnecting said top portions of vertically adjacent corrugated means in communication, said first set of duct means directing components separated from said mixture in said separation assembly and flowing from the lower end thereof downwardly towards a first sedimentation chamber positioned below the one of said first and second chambers corresponding to the lower end of said separation assembly and said second set of duct means being in direct liquid communication with the one of said first and second chambers corresponding to the lower end of said separation assembly;
    discharge means in said second chamber for removing liquid flowing from said separation assembly; and
    means positioned in said first chamber between said upper and lower portions defining a flow area through which said mixture flows from one portion to the other, said flow area converging in the direction of said flow towards a throat and then gradually diverging in the direction of said flow.

2. The device according to claim 1 wherein
    the separating passages of said separation assembly slope downwardly from said first chamber towards said second chamber with the upper end of said separation assembly being in communication with the upper portion of said first chamber;
    said first sedimentation chamber is in communication with said second chamber; and
    wherein said device further includes
    means for introducing said mixture into said lower portion of said first chamber;
    means for introducing a flocculating agent into said lower portion of said first chamber; and
    a partition located upstream of the intake end of said separation assembly having a plurality of slots which are substantially aligned with said valley portions of said separating passages and which have a width smaller than the components flocculated from said mixture in said first chamber, said partition having a slope promoting the upward movement of said flocculated components toward said upper portion of said first chamber.

3. The device according to claim 1 wherein
the separating passages of said separation assembly slope upwardly from said first chamber towards said second chamber with the lower end of said separation assembly being in communication with said lower portion of said first chamber;
said first sedimentation chamber is in communication with said first chamber; and
wherein said device further includes
means for introducing said mixture into said upper portion of said first chamber; and
means for introducing a precipitating agent into said upper portion of said first chamber.

4. A device for separating components from a mixture including components suspended in a liquid comprising
a basin having a supply chamber for said mixture, a discharge chamber, and at least one intermediate connecting chamber positioned between said supply chamber and said discharge chamber and having an upper portion;
a first separation assembly positioned in said basin between said supply chamber and said intermediate chamber and including an intake end communicating with said supply chamber, an outflow end communicating with said intermediate chamber, and a plurality of vertically spaced corrugated means having superposed top and valley portions defining a plurality of substantially parallel separating passages extending at an incline between said intake and outflow ends;
a second separation assembly positioned in said basin between said intermediate chamber and said discharge chamber and including an intake end communicating with said intermediate chamber, an outflow end communicating with said discharge chamber, and a plurality of vertically spaced corrugated means having superposed top and valley portions defining a plurality of substantially parallel separating passages extending at an incline between said intake and outflow ends, the outflow end of said first separation assembly and the intake end of said second separation assembly being spaced apart by said intermediate chamber so that said mixture sequentially flows through the separating passages of said first separation assembly, into said intermediate chamber, and then through the separating passages of said second separation assembly;
means in said intermediate chamber for removing components therefrom which have been separated from said mixture in said first and second separation assemblies and flow from the outflow and intake ends thereof, respectfully; and
guiding means in said intermediate chamber for directing liquid containing unseparated components exiting from the outflow end of said first separation assembly at either said top or valley portions towards corresponding top or valley portions at the intake end of said second separation assembly and for separately directing components separated from said mixture and exiting from said first and second separation assemblies at the other of said top or valley portions towards said removing means to thereby prevent direct remixing of said liquid and said separated components.

5. The device according to claim 4 wherein said intermediate chamber includes means for introducing thereinto an agent capable of promoting further separation of components from said mixture.

6. The device according to claim 4 wherein said mixture includes floating components and wherein said device further includes
a partition positioned in said intermediate chamber between the outflow end of said first separation assembly and the intake end of said second separation assembly, having an upward slope in the flow direction of said liquid between said first and second separation assemblies so as to guide floating components separating from said mixture towards the upper portion of said intermediate chamber, and having a plurality of vertical slots which are aligned with the superposed valley portions of the first and second separation assemblies and which have a width smaller than said floating components.

7. A device according to claim 4 including a vertical baffle positioned in said intermediate chamber between said first and second separation assemblies over which the liquid exiting the outflow end of said first separation assembly must flow before entering the intake end of said second separation assembly.

8. The device according to claim 4 including a plurality of vertical guiding partitions positioned in said intermediate chamber and extending between said first and second separation assemblies so as to define two sets of alternating guiding ducts, one set of said ducts interconnecting the respective superposed valley portions of said first and second separation assemblies in communication and the other set of said ducts interconnecting the respective superposed top portions of said first and second separation assemblies in communication and being in communication with said upper portion of said intermediate chamber.

9. A device according to claim 4 including
a transverse baffle dividing said intermediate chamber into first and second compartments, one compartment being in communication with the outflow end of said first separation assembly and the other being in communication with the intake end of said second separation assembly; and
by-pass means interconnecting said first and second compartments through which said mixture is flowed from said first separation assembly to said second separation assembly.

10. The device according to claim 4 including
the separating passages of said first separation assembly being inclined upwardly from said supply chamber toward said intermediate chamber;
the separation passages of said second separation assembly being inclined upwardly from said intermediate chamber towards said discharge chamber with the intake end of said second separation assembly being at an elevation below the outflow end of said first separation assembly;
two sets of first alternating guiding duct means connected to the intake end of said first separation assembly, one set of said first duct means interconnecting the superposed valley portions of said first separation assembly in communication and directing components separated from said mixture flowing therefrom downwardly into a first sedimentation collection chamber and the other set of said first duct means communicating with said supply chamber and interconnecting the superposed top portions of said first separation assembly in communication;

two sets of second alternating guiding duct means connected to the outflow end of said first separation assembly, one set of said second duct means interconnecting the superposed valley portions of said separation assembly in communication and directing components separated from said mixture flowing therefrom downwardly into a second sedimentation collection chamber and the other set of second duct means interconnecting the superposed top portions of said first separation assembly and directing the unseparated portion of said mixture flowing therefrom towards the upper portion of said intermediate chamber;

two sets of third alternating guiding duct means connected to the intake end of said second separation assembly, one set of said third duct means interconnecting the superposed valley portions of said second separations assembly in communication and directing components separated from said mixture flowing therefrom downwardly into a third sedimentation collection chamber and the other set of said third duct means interconnecting the superposed tops of said second separation assembly in communication, having an upper portion communicating with the upper portion of said intermediate chamber, and having a lower portion communicating with a fourth sedimentation collection chamber; and two sets of fourth alternating guiding duct means connected to the outflow end of said second separation assembly, one set of said fourth duct means interconnecting the superposed valley portions of said separation assembly in communication and directing components separated from said mixture flowing therefrom downwardly into a fifth sedimentation collection chamber and the other set of said fourth duct means interconnecting the top portions of said second separation assembly and directing the unseparated portion of said mixture flowing therefrom upwardly into said discharge chamber.

11. The device according to claim 10 including a substantially vertical overflow baffle positioned in said intermediate chamber adjacent to said second cut means over which the unseparated portion of said mixture flowing from the outflow end of said first separation assembly must flow before entering the intake end of said second separation assembly.

12. The device according to claim 10 including separate means connected to each of said sedimentation collection chamber for withdrawing the sediment collected therein.

13. A device for separating components from a mixture including components suspended in a liquid comprising a basin having a supply chamber for said mixture, a discharge chamber, and first and second intermediate chambers;

said first intermediate chamber being positioned between said supply chamber and said discharge chamber, having a lower portion communicating with a first sedimentation collecting means, and having an upper portion communicating with a flotation collecting means;

said second intermediate chamber being positioned between said first intermediate chamber and said discharge chamber, having a lower portion communicating with a second sedimentation collecting means, and having an upper portion communicating with said discharge means;

first and second separation assemblies in said basin including an intake end, an outflow end, and a plurality of vertically spaced corrugated means defining a plurality of substantially parallel separating passages extending from said intake end to said outflow end;

said first separation assembly being positioned between said supply chamber and said first intermediate chamber with the separating passages thereof inclining downwardly toward said first intermediate chamber;

said second separation assembly being positioned between said first and second intermediate chambers with the separating passages thereof inclining downwardly toward second intermediate chamber and with the intake thereof being positioned at an elevation above the outflow end of said first separation assembly; and guiding means positioned in said first intermediate chamber for guiding flow from the outflow end of said first separation assembly upwardly toward the intake end of said second separation assembly.

14. The device according to claim 13 wherein said first and second separation assemblies are symmetrically arranged in said basin;

said guide means includes at least one first duct directing flow upwardly from the outflow end of said first separation assembly toward the intake end of said second separation assembly and having a longitudinal axis substantially parallel to the longitudinal axes of the separating passages of said second separation assembly;

said discharge chamber is positioned above said first duct; and said second intermediate chamber includes at least one second duct directing flow upwardly from said second separation assembly into said discharge chamber in a flow direction intersecting the longitudinal axis of said first duct.

15. The device according to claim 13 wherein said first and second separation assemblies are symmetrically arranged in said basin; and said first intermediate chamber includes at least one duct directing flow upwardly from the outflow end of said first separation assembly towards the intake end of said second separation assembly and having a longitudinal axis substantially parallel to the longitudinal axes of the separation of said first separation assembly.

16. The device according to claim 15 including guide plate means in said first intermediate chamber for directing flow from said duct towards the intake end of said first separation assembly.

* * * * *

UNITED STATES PATENT OFFICE
CERTIFICATE OF CORRECTION

Patent No. 3,797,668          Dated   March 19, 1974

Inventor(s) Jacob Pielkenrood, Willen Lee Bernard Ambrosius, Willen Kooistra

It is certified that error appears in the above-identified patent and that said Letters Patent are hereby corrected as shown below:

On page 1 above [52] U.S. Cl. . . . . . . . .210/522 insert the following lines:

Foreign Application Priority Data

| | | |
|---|---|---|
| July 7, 1969 | Netherlands | 6910417 |
| July 17, 1969 | Netherlands | 6911027 |
| January 29, 1970 | Netherlands | 7001240 |

Signed and sealed this 10th day of September 1974.

(SEAL)
Attest:

McCOY M. GIBSON, JR.          C. MARSHALL DANN
Attesting Officer             Commissioner of Patents